United States Patent
Uno et al.

(10) Patent No.: US 7,070,664 B2
(45) Date of Patent: Jul. 4, 2006

(54) HIGH STRENGTH BOLT SUPERIOR IN DELAYED FRACTURE RESISTANT PROPERTY AND STEEL MATERIAL FOR THE SAME

(75) Inventors: Nobuyoshi Uno, Futtsu (JP); Hideo Kanisawa, Muroran (JP)

(73) Assignee: Nippon Steel Corporation, Tokyo (JP)

( * ) Notice: Subject to any disclaimer, the term of this patent is extended or adjusted under 35 U.S.C. 154(b) by 205 days.

(21) Appl. No.: 10/296,572

(22) PCT Filed: Mar. 22, 2002

(86) PCT No.: PCT/JP02/02796

§ 371 (c)(1),
(2), (4) Date: Nov. 22, 2002

(87) PCT Pub. No.: WO02/077467

PCT Pub. Date: Oct. 3, 2002

(65) Prior Publication Data

US 2003/0150529 A1 Aug. 14, 2003

(30) Foreign Application Priority Data

Mar. 22, 2001 (JP) .............................. 2001-82325

(51) Int. Cl.
C22C 38/22 (2006.01)
C22C 38/34 (2006.01)

(52) U.S. Cl. .................. 148/333; 148/334; 148/335; 470/17

(58) Field of Classification Search ......... 148/333–335
See application file for complete search history.

(56) References Cited

FOREIGN PATENT DOCUMENTS

| JP | 61-130456 | 6/1986 |
|----|-----------|--------|
| JP | 64-52045 | 2/1989 |
| JP | 1-191762 | 8/1989 |
| JP | 2-267243 | 11/1990 |
| JP | 3-6352 | 1/1991 |
| JP | 3-173745 | 7/1991 |
| JP | 3-229009 | 10/1991 |
| JP | 4-29607 | 1/1992 |
| JP | 5-9653 | 1/1993 |
| JP | 5-70890 | 3/1993 |

(Continued)

Primary Examiner—Deborah Yee
(74) Attorney, Agent, or Firm—Kenyon & Kenyon LLP

(57) ABSTRACT

A high strength bold superior in delayed fracture resistant property has a bolt tensile strength of 1200 N/mm². A high strength bolt comprised of a head portion and shaft portion formed by a steel material, wherein the relation between a bolt tensile strength TS (N/mm²) and tempering temperature T (° C.) satisfies the following expression (1), the relation between the bolt tensile strength TS (N/mm²) and the carbon equivalent $C_{eq}$ (%) calculated from the chemical composition of the steel material used for the high strength bolt satisfies the following expression (2), and the tensile strength of the bolt is refined to a range of 1200 N/mm² to 1600 N/mm² by quenching and tempering:

$$TS \leq 1.1T + 850 \quad (1)$$

$$TS \leq 550 C_{eq} + 1000 \quad (2)$$

where, $$C_{eq} = C + (Mn/6) + (Si/24) + (Ni/40) + (Cr/5) + (Mo/4) + (V/14).$$

4 Claims, 4 Drawing Sheets

FOREIGN PATENT DOCUMENTS

| | | |
|---|---|---|
| JP | 6-89768 | 11/1994 |
| JP | 7-126799 | 5/1995 |
| JP | 7-278735 | 10/1995 |
| JP | 8-225845 | 9/1996 |
| JP | 2000-328191 | 11/2000 |
| JP | 2001-62639 | 3/2001 |
| JP | 2001-288538 | * 10/2004 |
| WO | WO 00/18975 | 4/2000 |

* cited by examiner

HIGH STRENGTH BOLT SUPERIOR IN DELAYED FRACTURE RESISTANT PROPERTY AND STEEL MATERIAL FOR THE SAME

TECHNICAL FIELD

The present invention relates to a high strength bolt able to be used for example for civil engineering, construction, or building various types of plant structures and a steel material for the same, more particularly relates to a high strength bolt superior in delayed fracture resistant property having a bolt tensile strength of 1200 N/mm$^2$ or more and a steel material for the same.

BACKGROUND ART

When joining steel materials used in various industrial fields, as is well known, use is generally made of the means of bolting them in addition to various joining means using welding. In such bolting means, higher tensile strength of the steel materials is being promoted due to the pursuit of greater economy and technical advances. Much use is being made of friction joining means using high strength bolts offering high reliability in joints and superior in work efficiency as well particularly in the fields of civil engineering and construction.

As the high strength bolts used for friction joining, for example, extensive use is being made of the sets of friction joint use high strength hexagonal bolts, hexagonal nuts, and flat washers defined by the JIS-B-1186 of the Japan Industrial Standard and the sets of structural use Torque-Shear type high strength bolts, hexagonal nuts, and flat washers of JSSII-09 of the Japan Society of Steel Construction. Under these circumstances, recently, in particular along with the larger scale of civil engineering and construction structures, development of high strength bolts having bolt tensile strengths of 1200 N/mm$^2$ or more is being strongly sought.

A conventional high strength bolt is for example produced by quenching and tempering a low alloy steel such as SCM435 defined by JIS-G4105. When using such a machine-use tough steel for actual use, however, with a bolt having a tensile strength of 1200 N/mm$^2$ or more, the phenomenon of "delayed fracture" occurs where the bolt suddenly breaks after the elapse of a certain time from fastening even with use under the yield stress, so such bolts cannot be used as the all important joining parts for buildings and bridges. Therefore, the increase in strength of bolts has currently halted at 1100 N/mm$^2$ class refined steel.

Further, in the past, for a steel material for use for a high strength bolt, for example as disclosed in Japanese Unexamined Patent Publication (Kokai) No. 1-191762, Japanese Unexamined Patent Publication (Kokai) No. 3-173745, etc., there is a method of production taking note of the fact that the fracture face of a bolt due to delayed fracture exhibits grain boundary fractures and comprising reducing the P, S, and other impurities in the chemical composition of the steel material so as to strengthen the grain boundaries and, from the viewpoint of controlling the structure, adding Mo and Cr to enable high temperature quenching of 400° C. or more to impart properties not easily leading to fracture even with invasion of hydrogen, the cause of delayed fracture, into the steel material. In particular, reducing the impurity P, as disclosed in Japanese Unexamined Patent Publication (Kokai) No. 5-9653, is an extremely effective technique for reducing the P segregating at the grain boundaries and improving the grain boundary strength.

Even in the above method of production, however, if more than a certain concentration of hydrogen invades into the steel material, delayed fracture will occur, so further advances are desired for further improving the delayed fracture resistance property of a bolt.

Therefore, to further improve the delayed fracture resistance property of a bolt, it is effective to make it difficult for hydrogen to invade into the steel material or reduce the concentration of hydrogen at the old austenite grain boundaries. For example, as disclosed in Japanese Unexamined Patent Publication (Kokai) No. 5-70890, a technique has been proposed for suppression of the invasion and diffusion of hydrogen into the steel material by the simultaneous addition of Si and Ni to the steel material. Not only does such addition of Si impair the cold forging property of a bolt, however, but also the addition of Ni raises the cost.

Further, Japanese Unexamined Patent Publication (Kokai) No. 7-278735 discloses bolt steel having a tensile strength of 1200 N/mm$^2$ or more responding to the above request and superior in delayed fracture property. Further, the above publication describes as specific measures (1) adding together elements Mo, Cr, and V for causing remarkable secondary hardening at the time of tempering so as to enable the achievement of a strength of 1200 N/mm$^2$ or more even with high temperature tempering at 450° C. or more, (2) adding more than 0.35% to 1.0% of V to make the old austenite grain size No. 10 or less and tempering the steel at a high temperature of 450° C. or more to cause the precipitation of V carbides and nitrides forming hydrogen trap sites, (3) reducing the impurities P, S, and Si segregating at the grain boundaries to strengthen the old austenite grain boundaries, in particular reducing the amount of P to 0.008% or less, so that the bolt will not easily corrode even in a harsh corrosive environment of dipping in 36% hydrochloric acid, the amount of hydrogen invading the steel is remarkably reduced, and simultaneously the delayed fracture resistant property is improved, and (4) reducing the element Si strengthening the solid solution of ferrite to secure an amount of softening at the time of spheroidizing annealing and enable cold forging without reducing the amount of addition of other alloy elements improving the delayed fracture resistant property.

In this case as well, however, even when tempering at a temperature of 450° C. or more, when refining the steel to a tensile strength of 1400 N/mm$^2$ or more, there is the problem that the rate of occurrence of delayed fracture becomes high. Further, depending on the shape of the high strength bolt, in particular the thread shape, there is also the problem of a high possibility of early occurrence of delayed fracture.

Further, Japanese Examined Patent Publication (Kokoku) No. 6-89768 (set of high strength bolt, nut, and washer) discloses a high strength bolt designed so that the seat surface of the head portion is a conical surface tilted 90° to 150° with respect to the bolt axial center. In this case, due to variations unavoidable in manufacture, error unavoidable in installation, etc., the seat surface of the head portion cannot be given a uniform contact pressure and stress concentrates locally. In such a case, there is the problem that the bolt yield strength and delayed fracture resistant property fall. Further, a large amount of trouble and time are required compared with the past for forming the seat surface of the head portion and the washer receiving the seat surface of the head portion. Further, there are two types of seat surfaces and production control becomes complicated, so the cost is increased. Further, management of the two types of washers becomes necessary at the time of installation and there is the problem of a fall in the bolting efficiency.

A high strength bolt, however, as shown in FIG. 4, is comprised of a head portion 1 and a shaft portion 2 formed integrally by a steel material, but the location suffering from delayed fracture is mainly the thread part 3 cut into the shaft portion 2. This thread part 3 experiences a large concentration of stress. Further, it experiences a larger plastic deformation with respect to fastening in the bolt axial center X—X direction with a high axial force. Therefore, it is known from numerous research, delayed fracture occurs starting from such a location. Further, the thread part 3 of a conventional high strength bolt, for example, an M22 bolt defined in Japan Industrial Standard JIS B 1186 (F10T JIS metric coarse thread bolt), as shown in FIG. 5, normally has facing flanks 4a and 4b of threads 4 cut into it at an equidistant pitch L (2.5 mm) having an angle θ of for example 60°, has each thread 4 of the shaft portion 2 having a trapezoidal shape obtained by cutting a pointed peak 5 at H/8 from the tip, where H is the height from a bottom 5a of the pointed peak 5 (H=2.165 mm), and has each valley bottom 4c of the threads 4 formed into an arc-shaped curve by setting points of transition Q1 and Q2 between facing flanks 4a and 4b and the valley bottom 4c to H/3 from the bottoms 5a of the pointed peaks 5 and drawing an inscribed circle 6 contacting the points of transition Q1 and Q2 of the flanks 4a and 4b and having a radius R1 of H/6, where the center point O of the inscribed circle 6 is set at a height of H/12 from the positions of the points of transition Q1 and Q2. Due to this, the concentration of stress acting on the thread part 3 is reduced. Even with this, however, the coefficient of stress concentration acting on a center part M of a valley bottom 4c of the threads 4 is 2.54. When pulling uniformly in the bolt axial center X—X direction by a standard bolt tension corresponding to a tensile strength of 1200 N/mm$^2$ or more, large plastic strain still occurs at the valley bottom of the threads and the occurrence of delayed fracture of the high strength bolt at a tensile strength of 1200 N/mm$^2$ or more is still not dealt with.

Therefore, the present inventor engaged in various research considering the above situation and as a result discovered the relation between the bolt tensile strength and tempering temperature and the relation between the bolt tensile strength and carbon equivalent calculated from the chemical composition of the steel material and set the chemical composition of the steel material and performed quenching and tempering so as to satisfy these two relations and thereby perfected a high strength bolt superior in delayed fracture resistant property able to be improved in bolt tensile strength to 1200 N/mm$^2$ or more and a steel material for the same.

DISCLOSURE OF THE INVENTION

To achieve the above object, a first aspect of the present invention lies in a high strength bolt characterized in that the relation between a tensile strength TS (N/mm$^2$) of the high strength bolt and tempering temperature T (° C.) satisfies the following expression (1), the relation between the tensile strength TS (N/mm$^2$) of the high strength bolt and the carbon equivalent $C_{eq}$ (%) calculated from the chemical composition of the steel material used for the high strength bolt satisfies the following expression (2), and the tensile strength of the bolt is refined to a range of 1200 N/mm$^2$ to 1600 N/mm$^2$ by quenching and tempering:

$$TS \leq 1.1T + 850 \tag{1}$$

$$TS \leq 550 C_{eq} + 1000 \tag{2}$$

where,
TS: tensile strength of high strength bolt (N/mm$^2$)
T: tempering temperature (° C.)
$C_{eq}$: carbon equivalent (%)
where, $$C_{eq} = C + (Mn/6) + (Si/24) + (Ni/40) + (Cr/5) + (Mo/4) + V/14)$$

Further, a second aspect of the present invention lies in a high strength bolt of the first aspect characterized in that said steel material contains, by wt %,
C: 0.30 to 0.45%,
Si: less than 0.10%,
Mn: more than 0.40% to less than 1.00%,
P: less than 0.010%,
S: not more than 0.010%,
Cr: 0.5% to less than 1.5%,
Mo: more than 0.35% to less than 1.5%,
V: more than 0.30% to 1.0% and the remainder Fe and unavoidable impurities.

Further, a third aspect of the present invention lies in a high strength bolt of the first or second aspect characterized in that an angle of facing flanks of threads of a thread part cut at an equidistant pitch in the shaft portion is 60° and the valley bottoms of said thread part are formed into arc-shaped curves comprised by the three-arc synthesis method (a) defined by the following conditions and calculation formula: Here, the (a) "three-arc composition method" is the method of forming an arc-shaped curve by setting points of transition between facing flanks of pointed peaks and a valley bottom to (9±1)H/20 from the bottom of the pointed peaks, wherein H is the height of a pointed peak, drawing small contacting circles contacting the flanks at the points of transition and having radii "r" of H/6, drawing a circumcircle of the small contacting circles having a center on a bisector of the acute angle formed by the extensions of the facing flanks and having a radius "R" of at least 2H/3, and superposing the valley bottom side arcs of the small contacting circles and the circumcircle.

Still further, a fourth aspect of the present invention lies in a steel material for a high strength bolt characterized in that the relation between a tensile strength TS (N/mm$^2$) of the high strength bolt and tempering temperature T (° C.) satisfies the following expression (1), the relation between the tensile strength TS (N/mm$^2$) of the high strength bolt and the carbon equivalent $C_{eq}$ (%) calculated from the chemical composition of the steel material used for the high strength bolt satisfies the following expression (2), and the tensile strength of the bolt is refined to a range of 1200 N/mm$^2$ to 1600 N/mm$^2$ by quenching and tempering:

$$TS \leq 1.1T + 850 \tag{1}$$

$$TS \leq 550 C_{eq} + 1000 \tag{2}$$

where,
TS: tensile strength of high strength bolt (N/mm$^2$)
T: tempering temperature (° C.)
$C_{eq}$: carbon equivalent (%)
where, $$C_{eq} = C + (Mn/6) + (Si/24) + (Ni/40) + (Cr/5) + (Mo/4) + (V/14).$$

Note that, further, a fifth aspect of the present invention lies in a steel material for a high strength bolt of the fourth aspect characterized in that said steel material contains, by wt %,
C: 0.30 to 0.45%,
Si: less than 0.10%,
Mn: more than 0.40% to less than 1.00%,
P: less than 0.010%,
S: not more than 0.010%,
Cr: 0.5% to less than 1.5%,
Mo: more than 0.35% to less than 1.5%,
V: more than 0.30% to 1.0% and the remainder Fe and unavoidable impurities.

Further, a sixth aspect of the present invention lies in a steel material for a high strength bolt of the fifth aspect characterized by further containing, by wt %,
Al: 0.010 to 0.100%.

Further, a seventh aspect of the present invention lies in a steel material for a high strength bolt of the sixth aspect characterized by further containing, by wt %, one or both of:
Nb: 0.005 to 0.030% and
Ti: 0.005 to 0.030%.

BEST MODE FOR CARRYING OUT THE INVENTION

Figure 1:
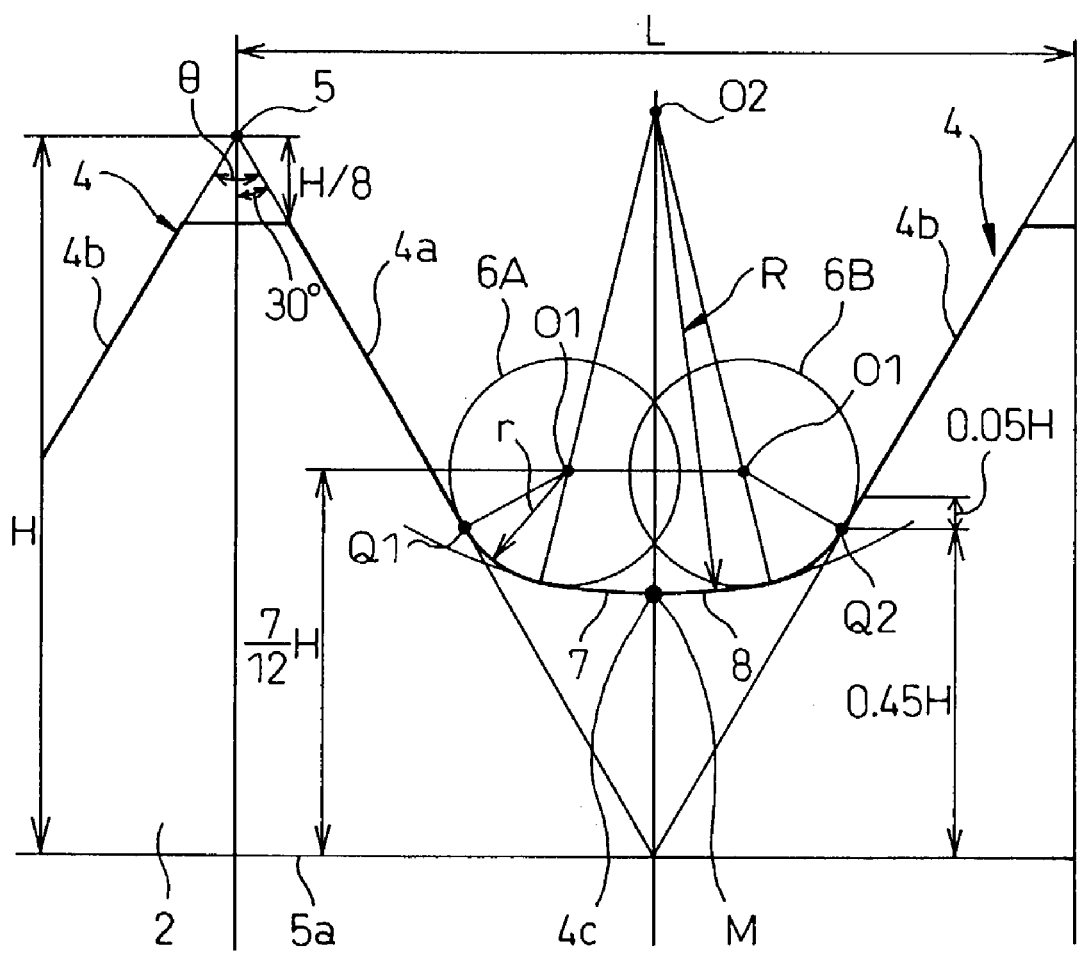
FIG. 1 is an enlarged explanatory view of principal parts of a thread part showing an embodiment of a high strength bolt according to the present invention.

The reasons for limiting the present invention to the above components and tempering temperature will be explained next. Note that in the following explanation, "%" indicates "wt %".

(A) Chemical Composition of Steel

C: C is an element effective for easily imparting strength, but with a content of less than 0.30%, the strength cannot be secured. Further, if added in an amount over 0.45%, the toughness deteriorates. Therefore, the range of this ingredient is made 0.30% to 0.45%.

Si: Si is an element necessary for deoxidation of the steel and is effective for raising the strength of the steel, but if the content is 0.1% or more, the toughness deteriorates and the steel becomes remarkably brittle. Further, it is an element with a large action of strengthening the solid solution of ferrite, so cold forging becomes difficult even with spheroidizing annealing. Further, this is an element which causes grain boundary oxidation to easily occur at the time of heat treatment and causes deterioration of the delayed fracture resistant property of the bolt due to the notch effect, so should be reduced as much as possible. Therefore, the range of this ingredient is limited to less than 0.10%.

Mn: Mn is an element effective for raising the quenchability, but if added in an amount of 0.40% or less, the desired effects cannot be obtained. Further, if added in an amount of 1.00% or more, temper brittleness occurs and the delayed fracture resistant property deteriorates, so the range of this ingredient should be set to over 0.40% to less than 1.00%.

P: P is an element segregating at the grain boundary, lowering the grain boundary strength, and deteriorating the delayed fracture resistant property. Further, it is an element increasing the amount of corrosion of steel through the effect of promoting the generation of hydrogen at the surface of the steel material in a harsh corrosive environment of hydrochloric acid and should be reduced as much as possible. If the content is 0.010% or more, the amount of hydrogen invading the steel material remarkably increases, so the content was made less than 0.010%.

S: S is an element segregating at the grain boundary and promoting brittleness of the steel, so the content of S should be reduced as much as possible. If the content exceeds 0.010%, the brittleness becomes remarkable, so the upper limit was made not more than 0.010%.

Cr: Cr is an element effective for improving the quenchability of steel and is effective for imparting temper softening resistance to steel, but if the amount added is less than 0.5%, there is no effect in this action. On the other hand, considering the economy, the amount of addition was made 0.5% to less than 1.5%.

Mo: Mo is an element causing remarkable secondary hardening and is an element improving the delayed fracture resistant property by enabling high temperature tempering, but if the amount added is less than 0.35%, the desired effect cannot be obtained, while if added over 1.5%, the undissolved carbides are hard to dissolve into the matrix in solid solution at the time of quenching and the ductility is impaired, so the amount added was made more than 0.35% and less than 1.5%.

V: V is an element precipitating as fine nitrides and carbides at the time of tempering and improving the strength of the steel and enable high temperature tempering. Further, it has the effect of increasing the fineness of the old austenite grains. Further, the carbides and nitrides precipitating in the grains at the time of tempering become trap sites of hydrogen and reduce the hydrogen collecting at the grain boundaries, so have the effect of greatly improving the delayed fracture resistant property. If the amount added is 0.3% or less, however, the old austenite grain size No. 10 cannot be reached and the delayed fracture resistant property will not be improved. Further, if added in an amount more than 1.0%, the cold forging property of the bolt is impaired. Further, V is an expensive element, so considering economy as well, the content was made more than 0.3% to 1.0%.

Al: Al is an element necessary for the deoxidation of steel and has the effect of forming nitrides and increasing the fineness of the old austenite. If less than 0.010%, however, the effect is small. Further, if over 0.100%, the alumina-based inclusions increase and impair the toughness. Therefore, when included, the range of this ingredient should be made 0.010 to 0.100%.

Nb: Nb has the action of increasing the fineness of the old austenite grains and further precipitating and hardening to improve the strength of the steel. If the amount added is less than 0.005%, however, the effect cannot be obtained, while if included in more than 0.030%, the effect ends up becoming saturated, so when included, the content should be made 0.005 to 0.030%.

Ti: Ti has the action of increasing the fineness of the old austenite grains and further precipitating and hardening to improve the strength of the steel. If the amount added is less than 0.005%, however, the effect cannot be obtained, while if included in more than 0.030%, the effect ends up becoming saturated, so when included, the content should be made 0.005 to 0.030%.

(b) Tempering Temperature

A delayed fracture exhibits old austenite grain boundary fractures, so to improve the delayed fracture resistant property of a bolt, it is sufficient to avoid the low temperature temper brittleness temperature region of 250 to 400° C. Further, to suppress the precipitation of film-like cementite at the old austenite grain boundaries, it is effective to control the form of the carbides due to the rise in tempering temperature and effective to cause precipitation of V carbonitrides forming hydrogen trap sites to reduce the hydrogen concentrated at the grain boundaries. Therefore, it is possible to make the tempering temperature 450° C. or more, but the invention is not limited to this. It was learned from experimental results that it is sufficient if making the tempering temperature a value satisfying the later described relation between the tensile strength TS (N/mm²) of the high strength bolt and the tempering temperature T (° C.) and the later described relation between the tensile strength TS (N/mm²) of the high strength bolt and the carbon equivalent $C_{eq}$.

Next, an embodiment of the present invention will be explained in detail with reference to the drawings shown in FIG. 1 to FIG. 3. Note that in the embodiments of the present invention, portions overlapping the high strength bolt of the conventional structure shown in FIG. 4 and FIG. 5 in configuration will be explained using the same reference numerals.

Figure 4:
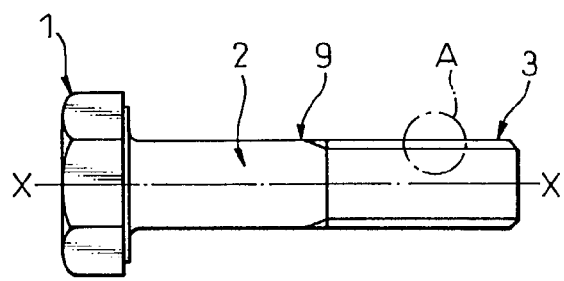
FIG. 4 is an explanatory view of a conventional high strength bolt.

The high strength bolt 9 according to the present invention, like the conventional structure shown in FIG. 4, is comprised of a head portion 1 and shaft portion 2 comprised of a steel material formed integrally. Further, as shown in FIG. 1, the facing flanks 4a, 4b of the threads 4, 4 of the thread part 3 cut into the shaft portion 2 at the equidistant pitch L have, for example, an angle θ of 60°. Further, the valley bottom 4c of the threads 4, 4 is formed into an arc-shaped curve obtained by the above-mentioned three-arc composition method.

That is, the thread part 3 of the high strength bolt 9 has a thread 4 of the shaft portion 2 having a trapezoidal shape obtained by cutting the pointed peak 5 H/8 from the tip where H is the height from the bottom 5a of the pointed peak 5 (for example, H=2.165 mm). Further, the points of transition Q1 and Q2 between the facing flanks 4a and 4b of the threads 4 and the valley bottom 4c are set to a height of [(9±1)/20]·H, for example, 0.45H, from the bottom 5a of the pointed peaks 5. Further, the valley bottom 4c of the threads 4, 4 is formed into the objective arc-shaped curve 8 by drawing small contacting circles 6A and 6B having centers O1 at the height of (7/12)·H from the bottom 5a of the pointed peaks 5, having radii "r" of H/6, and contacting the flanks 4a and 4b of the threads 4, 4 at the points of transition Q1 and Q2, drawing a circumcircle 7 of the small contacting circles 6A and 6B having a center O2 on the bisector of the acute angle formed by the extensions of the facing flanks 4a and 4b of the threads 4 and having a radius "R" of at least 2H/3, and superposing the circumcircle 7 and small contacting circles 6A and 6B.

For reference, the reason for setting the points of transition Q1 and Q2 at a height of [(9±1)/20]·H, for example, 0.45H, from the bottom 5a of the pointed peaks 5 is to maintain a suitable engagement rate preventing detachment of the bolt when forming the valley bottoms 4c of the threads 4 and 4 into arc-shaped curves 8 satisfying the above object at the thread part 3 of the high strength bolt according to the present invention. That is, with a height of the points of transition Q1 and Q2 lower than the lower limit of (8/20)·H, it is not possible to form arc-shaped curves 8 satisfying the object. On the other hand, above the upper limit of (10/20)·H, it becomes difficult to maintain a suitable engagement rate.

The reason for drawing the small contacting circles 6A and 6B having radii "r" and contacting the flanks 4a and 4b of the threads 4, 4 at the points of transition Q1 and Q2 is to obtain the arc-shaped curve 8 of a valley bottom 4c of the threads 4, 4 giving a relatively small stress concentration. This is an experimental finding obtained by simulating numerous arc-shaped curves centered on numerous positions for various small contacting circles having different diameters for these points of transition Q1 and Q2, calculating the stress, and selecting the small contacting circles giving the lowest degree of stress concentration among them.

Further, the reason for drawing a circumcircle 7 of the small contacting circles 6A and 6B having a center O2 on a bisector of the acute angle formed by the extensions of the facing flanks 4a and 4b of the threads 4, 4 and having a radius R of (2/3)·H or more and superposing the circumcircle 7 and small contacting circles 6A and 6B to form an arc-shaped curve 8 is to obtain the arc-shaped curve 8 most smoothly contacting the valley bottom 4c side arcs of the small contacting circles 6A and 6B. These are also experimental findings obtained by many simulations.

Figure 5:
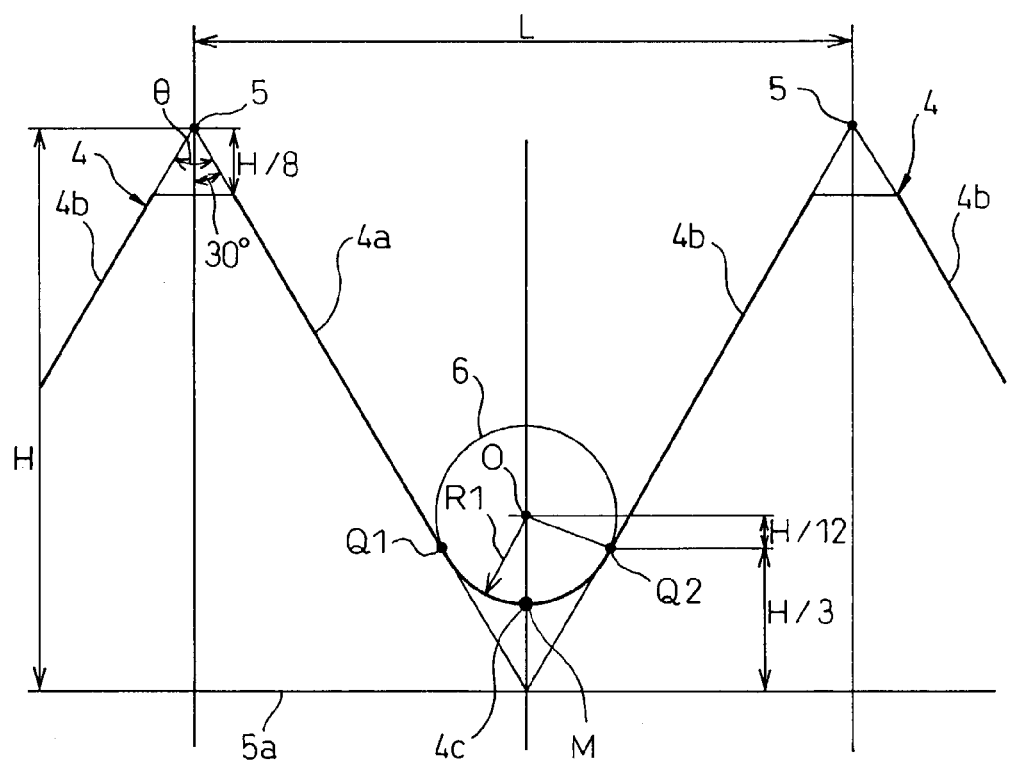
FIG. 5 is an enlarged explanatory view of principal parts of part A of FIG. 4.

In this way, by the high strength bolt according to the present invention forming the valley bottom 4c of the threads 4, 4 to a specific arc-shaped curve 8 by the three-arc composition method described above, it is possible to reduce the coefficient of stress concentration at the center part M of the valley bottom 4c to 1.66 and greatly reduce the stress and strain at the thread valley bottom compared with the conventional M22 bolt shown in FIG. 5 (F10T JIS metric coarse thread bolt) when uniformly pulling in the bolt axial center X—X direction by the standard bolt tension (22.5 tons) defined by the Architectural Institute of Japan Building Material and Construction Procedure Standard JASS6. Due to this, an improvement in the delayed fracture resistant property of the high strength bolt is achieved.

On the other hand, the important problem with a high strength bolt relates to how to give delayed fracture resistant performance to a bolt when making it high in strength. F11T JIS metric coarse thread bolts are used in the range of strength of 1100 N/mm² to 1300 N/mm², but there is a danger of delayed fracture, so currently they are not being made and are impossible to obtain. Therefore, under the current conditions, F10T JIS metric coarse thread bolts having a strength in the range of 1000 N/mm² to 1200 N/mm² are being widely used. The reason why such an upper limit on strength is set for high strength bolts in this way is that if the strength is raised, delayed fracture easily occurs.

Therefore, the inventors engaged in numerous experiments as shown in the following examples, arranged the tensile strengths of the steel materials with reference to the tempering temperature and carbon equivalent as yardsticks, and plotted the occurrence of delayed fracture using the x marks (delayed fracture occurring) and o marks (delayed fracture not occurring) shown in FIG. 2 and FIG. 3 from the large amount of detailed experimental data obtained using test steels having the chemical compositions shown in the following Table 1. Next, detailed examples will be explained.

EXAMPLES

The test steels having the chemical compositions shown in the following Table 1 were used and hot rolled to wire rods of diameters of 21.5 mm. The obtained various types of wire rods were used to prepare two types of bolts having M22 thread parts (F10T JIS metric coarse thread bolts) of the conventional shape and the shape of the present invention. Next, these were refined to bolt tensile strengths in a range of 1200 N/mm$^2$ to 1700 N/mm$^2$ by quenching and tempering. In this case, the tensile strength was adjusted by the composition and tempering temperature, and the tempering was performed at a temperature in the range of 290° C. to 700° C. The tempering temperature and tensile strength at this time are shown in Table 2.

Formula satisfied: "Good"
Formula not satisfied: "poor"

The delayed fracture properties of these bolts were evaluated using the following two types of methods:

(i) First, the composition of the steel material and method of evaluation of the effects of the tempering temperature will be shown.

At the present time, extremely large amounts of SCM440, defined in the JIS G4105 refined to 1100 N/mm$^2$ and generally used as a steel material for high stress bolts, are being used for automobiles, but no delayed fracture occurs. If increasing the amount of diffusible hydrogen invading the SCM440 by corrosion, however, finally delayed fracture occurs. The amount of diffusible hydrogen at this time is used as the standard for the delayed fracture resistant property. That is, normally, when raising the tensile strength,

TABLE 1

| Test steel | C | Si | Mn | P | S | Cr | Mo | Al | V | Ni | Ti | Nb | $C_{eq}$ |
|---|---|---|---|---|---|---|---|---|---|---|---|---|---|
| 1 | 0.40 | 0.07 | 0.42 | 0.005 | 0.009 | 0.61 | 1.20 | 0.020 | 0.56 | | | | 0.935 |
| 2 | 0.34 | 0.04 | 0.79 | 0.007 | 0.003 | 1.21 | 0.99 | 0.010 | 0.36 | | | | 0.989 |
| 3 | 0.34 | 0.03 | 0.66 | 0.002 | 0.002 | 0.98 | 0.50 | 0.098 | 0.67 | | | | 0.820 |
| 4 | 0.39 | 0.07 | 0.50 | 0.008 | 0.008 | 1.21 | 0.58 | 0.025 | 0.35 | | | | 0.888 |
| 5 | 0.39 | 0.05 | 0.51 | 0.005 | 0.009 | 1.21 | 0.57 | 0.021 | 0.34 | | | | 0.886 |
| 6 | 0.40 | 0.08 | 0.81 | 0.005 | 0.008 | 0.58 | 0.22 | 0.019 | 0.35 | 0.65 | 0.04 | | 0.751 |
| 7 | 0.40 | 0.05 | 0.54 | 0.009 | 0.008 | 1.00 | 1.00 | 0.032 | 0.32 | | | | 0.942 |
| 8 | 0.4 | 0.03 | 0.85 | 0.005 | 0.004 | 0.90 | 1.45 | 0.020 | 0.70 | 0.50 | 0.02 | | 1.188 |
| 9 | 0.43 | 0.05 | 0.80 | 0.005 | 0.003 | 1.01 | 1.20 | 0.033 | 0.40 | 0.20 | | 0.028 | 1.100 |
| 10 | 0.42 | 0.05 | 0.75 | 0.003 | 0.004 | 0.83 | 1.10 | 0.030 | 0.40 | 0.10 | | 0.010 | 1.020 |
| 11 | 0.41 | 0.08 | 0.95 | 0.007 | 0.001 | 1.41 | 0.93 | 0.072 | 0.40 | 0.00 | | | 1.115 |
| 12 | 0.31 | 0.06 | 0.50 | 0.018 | 0.007 | 1.01 | 0.60 | 0.032 | 0.29 | 0.00 | | | 0.769 |
| 13 | 0.34 | 0.17 | 0.76 | 0.015 | 0.017 | 1.00 | 0.17 | 0.025 | 0.00 | 0.00 | | | 0.716 |
| 14 | 0.19 | 0.08 | 0.97 | 0.013 | 0.004 | 0.15 | 0.00 | 0.032 | 0.00 | 0.00 | | | 0.385 |
| 15 | 0.40 | 0.23 | 0.81 | 0.005 | 0.008 | 0.58 | 0.22 | 0.019 | 0.00 | 0.65 | 0.04 | | 0.732 |
| 16 | 0.32 | 0.21 | 0.62 | 0.010 | 0.008 | 1.25 | 0.59 | 0.027 | 0.00 | 0.00 | 0.02 | | 0.830 |
| 17 | 0.30 | 0.94 | 0.49 | 0.011 | 0.006 | 1.99 | 0.20 | 0.074 | 0.00 | 0.00 | | | 0.869 |
| 18 | 0.32 | 0.99 | 0.46 | 0.007 | 0.006 | 1.97 | 0.40 | 0.027 | 0.00 | 0.00 | | | 0.932 |

$C_{eq} = C + (Mn/6) + (Si/24) + (Ni/40) + (Cr/5) + (Mo/4) + (V/14)$.

TABLE 2

| | Test steel | Tempering temp. (° C.) | Tensile strength TS (N/mm$^2$) | TS ≤ 1.1T + 850 | TS ≤ 550$C_{eq}$ + 1000 | Limit amount of diffusable hydrogen (ppm) |
|---|---|---|---|---|---|---|
| Example | 1 | 550 | 1338 | Good | Good | 1.54 |
| | 2 | 550 | 1408 | Good | Good | 0.91 |
| | 3 | 500 | 1362 | Good | Good | 1.54 |
| | 4 | 625 | 1426 | Good | Good | 1.40 |
| | 5 | 650 | 1312 | Good | Good | 1.70 |
| | 6 | 450 | 1316 | Good | Good | 0.70 |
| | 7 | 570 | 1470 | Good | Good | 0.90 |
| | 8 | 700 | 1605 | Good | Good | 0.95 |
| | 9 | 660 | 1550 | Good | Good | 1.05 |
| | 10 | 640 | 1502 | Good | Good | 1.20 |
| Comparative Example | 11 | 525 | 1652 | Poor | Poor | 0.12 |
| | 12 | 440 | 1469 | Poor | Poor | 0.29 |
| | 13 | 390 | 1567 | Poor | Poor | 0.05 |
| | 14 | 290 | 1384 | Poor | Poor | 0.09 |
| | 15 | 435 | 1482 | Poor | Poor | 0.40 |
| | 16 | 450 | 1473 | Poor | Poor | 0.45 |
| | 17 | 450 | 1497 | Poor | Poor | 0.25 |
| | 18 | 400 | 1651 | Poor | Poor | 0.10 |

$C_{eq} = C + (Mn/6) + (Si/24) + (Ni/40) + (Cr/5) + (Mo/4) + (V/14)$.

while the absolute value differs for each steel material, the amount of diffusible hydrogen of the limit where no delayed fracture occurs falls. In particular, if the strength becomes an extremely high one of 1400 N/mm² or more, delayed fracture occurs even with a small amount of diffusible hydrogen.

The delayed fracture test was conducted by fabricating a V-notched test piece by cutting, dipping the test piece in 36% hydrochloric acid for a predetermined time, rapidly increasing the hydrogen in the test piece forcibly, then allowing the test piece to stand in the atmosphere for 30 minutes and applying a tensile stress of the notch strength× 0.7 by a constant weight load device.

The amount of diffusible hydrogen invading the steel at this time was measured by the heat analysis method. At the same time, the relation between the amount of diffusible hydrogen and fracture time was investigated for each type of steel. The amount of diffusible hydrogen where the steel piece does not fracture for 100 hours or more was made the limit amount of diffusible hydrogen for each steel type.

The limit amount of diffusible hydrogen when improving the SCM440 of the current high stress bolt steel material to the 1100 N/mm² class (TS of 1200 N/mm²) was 0.55 ppm. The delayed fracture resistant property of the high strength material was evaluated using the limit amount of diffusible hydrogen as a judgement criteria by the standard of the steel material having a limit amount of diffusible hydrogen of at least the 0.55 ppm limit amount of diffusible hydrogen of the current 1100 N/mm² class SCM440 not experiencing delayed fracture even when the strength is high.

(ii) Next, regarding the shape of the bolt as it effects the delayed fracture resistant property, the same axial force is imparted to a bolt of the conventional shape and bolt of a thread part of the shape of the present invention and the shapes evaluated by the occurrence of fracture during the 12 months of the test period by repetition of wetting by a 3.5% NaCl aqueous solution and drying by the Ferris wheel method.

The results are shown in the following Table 3. It is clear that the examples of the present invention are superior in delayed fracture resistant property to the comparative examples.

TABLE 3

|  | Test steel | Bolt type | Delayed fracture characteristic by Ferris wheel method (12 months) |
|---|---|---|---|
| Example | 1 | Invention shape | No fracture |
|  | 2 | " | " |
|  | 3 | " | " |
|  | 4 | " | " |
|  | 5 | " | " |
|  | 6 | " | " |
|  | 7 | " | " |
|  | 8 | " | " |
|  | 9 | " | " |
|  | 10 | " | " |
| Comparative Example | 1 | JIS shape | Fracture |
|  | 2 | " | " |
|  | 3 | " | " |
|  | 4 | " | " |
|  | 5 | " | " |
|  | 6 | " | " |
|  | 7 | " | " |
|  | 8 | " | " |
|  | 9 | " | " |
|  | 10 | " | " |
| Comparative Example | 11 | Invention shape | Fracture |
|  | 12 | " | " |
|  | 13 | " | " |

TABLE 3-continued

|  | Test steel | Bolt type | Delayed fracture characteristic by Ferris wheel method (12 months) |
|---|---|---|---|
|  | 14 | " | " |
|  | 15 | " | " |
|  | 16 | " | " |
|  | 17 | " | " |
|  | 18 | " | " |
| Comparative Example | 11 | JIS shape | Fracture |
|  | 12 | " | " |
|  | 13 | " | " |
|  | 14 | " | " |
|  | 15 | " | " |
|  | 16 | " | " |
|  | 17 | " | " |
|  | 18 | " | " |

Figure 2:
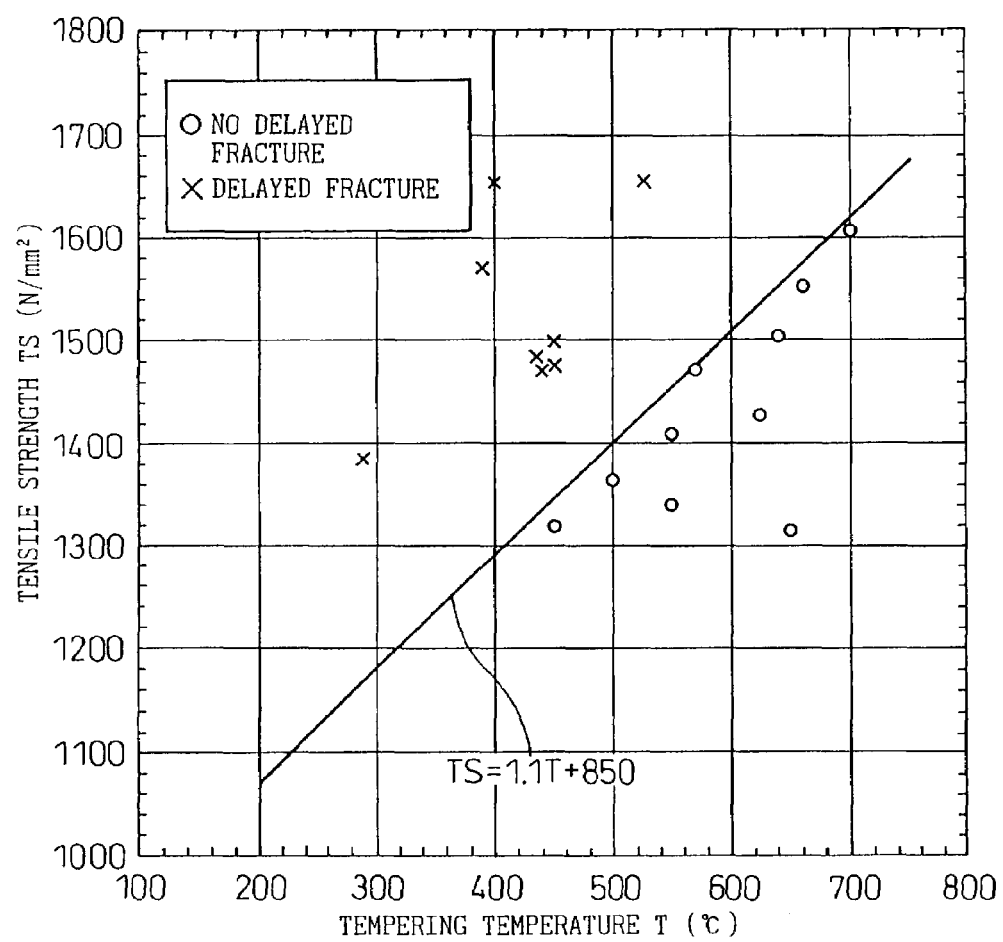
FIG. 2 is an explanatory view of the relation between a tempering temperature and tensile strength of a steel material.

Further, as a result, the inventors discovered that, as shown in FIG. 2, around a certain line in the relation between the tensile strength TS (N/mm²) of the steel material and the tempering temperature T (° C.), for example, a tempering temperature T of about 550° C., delayed fracture occurs at a tensile strength of the steel material of over about 1460 N/mm², but that no delayed fracture occurs below that and obtained the following expression:

$$TS \leq 1.1T + 850 \tag{1'}$$

Figure 3:
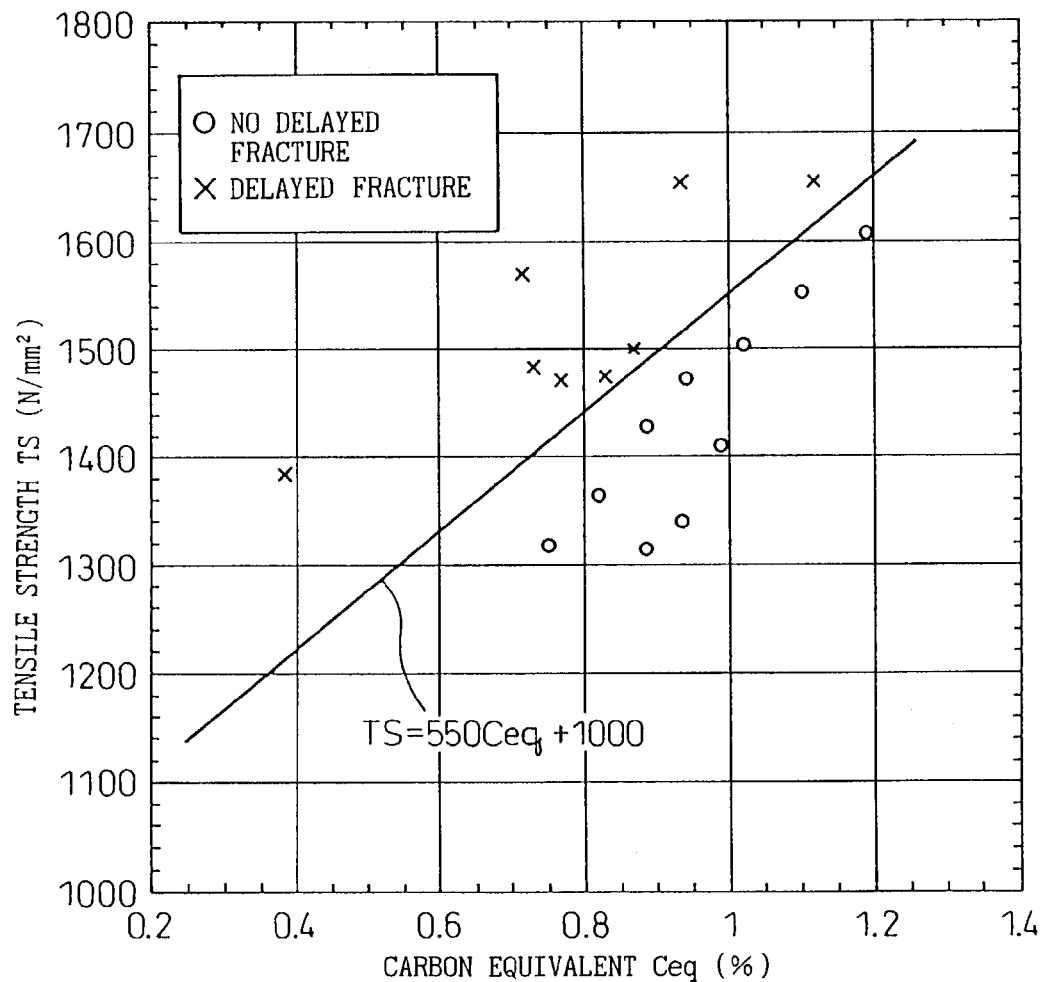
FIG. 3 is an explanatory view of the relation between a carbon equivalent and tensile strength of a steel material.

On the other hand, the inventors discovered that, as shown in FIG. 3, around a certain line in the relation between the tensile strength TS of the steel material and the carbon equivalent $C_{eq}$ (%), for example, a carbon equivalent $C_{eq}$ of about 0.85%, delayed fracture occurs at a tensile strength of the steel material of over about 1460 N/mm², but that no delayed fracture occurs below that and obtained the following expression:

$$TS \leq 550 C_{eq} + 1000 \tag{2'}$$

In this case, the carbon equivalent $C_{eq}$ of the steel material itself is expressed by the following JIS definition:

$$C_{eq} = C + (Mn/6) + (Si/24) + (Ni/40) + (Cr/5) + (Mo/4) + (V/14).$$

Therefore, if setting the range of the tensile strength TS (N/mm²) by the two factors of the tempering temperature T of the steel material and the carbon equivalent $C_{eq}$ calculated from the chemical composition to the lower limit range of the above expressions (1') and (2') so that delayed fracture does not occur:

$$TS \leq 1.1T + 850 \tag{1}$$

$$TS \leq 550 C_{eq} + 1000 \tag{2}$$

and satisfying these two expressions (1) and (2), the tensile strength TS of the steel material may be easily refined to a range of 1200 N/mm² to 1600 N/mm².

Further, the chemical composition of the above steel material, for example as disclosed by Japanese Unexamined Patent Publication (Kokai) No. 7-278735 previously filed by the applicant, contains at least, by wt %, C: 0.30 to 0.45%,
Si: less than 0.10%,
Mn: more than 0.40% to less than 1.00%,
P: less than 0.010%,
S: not more than 0.010%, Cr: 0.5% to less than 1.5%,
Mo: more than 0.35% to less than 1.5%,
V: more than 0.30% to 1.0% and the remainder Fe and unavoidable impurities.

In this case, the above steel material may, in accordance with need, further contain, by wt %, Al: 0.010 to 0.100% and further, by wt %, one or both of

Nb: 0.005 to 0.030% and
Ti: 0.005 to 0.030%.

The high strength bolt obtained by the present invention has a superior delayed fracture resistant property in a range of strength of 1200 N/mm² to 1600 N/mm². Therefore, compared with the conventional 1000 N/mm² to 1100 N/mm² class high strength bolt, (1) the number of bolts required for joining members can be reduced and the joints can be made more compact and lighter in weight, (2) higher strength bolting of thicker steel plate becomes possible and the freedom of design is increased, (3) the bolts can be reduced in diameter and therefore the work efficiency when carrying and fastening the bolts is improved, and (4) reduction of the total cost of construction of the joints can be reduced by the above effects.

Note that the carbon equivalent $C_{eq}$ is preferably set to not more than 1.4%. If higher than this value, the hardness before formation of the bolt is too high, a remarkable drop in the die lifetime and processing cracks in the bolt occur, and stable industrial production becomes difficult.

INDUSTRIAL APPLICABILITY

In this way, the high strength bolt according to the present invention is characterized by satisfying the various expressions among the bolt tensile strength and tempering temperature and carbon equivalent calculated from the chemical composition and refining the range of the bolt tensile strength by quenching and tempering. Due to this, it is possible to provide a high strength bolt superior in delayed fracture resistant property having a bolt tensile strength of at least 1200 N/mm².

The invention claimed is:

1. A high strength bolt characterized in that a steel material used for the high strength bolt has a chemical composition containing, by weight %, less than 0.10% of Si and the remainder Fe and unavoidable impurities and that the relation between a tensile strength TS (N/mm²) of the high strength bolt and tempering temperature T (° C.) satisfies the following expression (1), the relation between the tensile strength TS (N/mm²) of the high strength bolt and the carbon equivalent $C_{eq}$ (%) calculated from the chemical composition of the steel material used for the high strength bolt satisfies the following expression (2), and the tensile strength of the bolt is refined to a range of 1426 N/mm² to 1600 N/mm² by quenching and tempering:

$$TS \leq 1.1T + 850 \quad (1)$$

$$TS \leq 550 C_{eq} + 1000 \quad (2)$$

where,
TS: tensile strength of high strength bolt (N/mm²)
T: tempering temperature (° C.)
$C_{eq}$: carbon equivalent (%)
where, $$C_{eq} = C + (Mn/6) + (Si/24) + (Ni/40) + (Cr/5) + (Mo/4) + (V/14);$$

and an angle of facing flanks of threads of a thread part cut at an equidistant pitch in the shaft portion is 60° and the valley bottoms of said thread part are formed into arc-shaped curves comprised by the three-arc synthesis method (a) defined by the following conditions and calculation formula:

(a) the three-arc synthesis method is the method of forming an arc-shaped curve by setting points of transition between facing flanks of pointed peaks and a valley bottom to (9±1)H/20 from the bottom of the pointed peaks, wherein H is the height of a pointed peak, drawing small contacting circles contacting the flanks at the points of transition and having radii "r" of H/6, drawing a circumcircle of the small contacting circles having a center on a bisector of the acute angle formed by the extensions of the facing flanks and having a radius "R" of at least 2H/3, and superposing the valley bottom side arcs of the small contacting circles and the circumcircle.

2. A high strength bolt as set forth in claim 1, characterized in that said steel material contains, by wt %, C: 0.30 to 0.45%,
Mn: more than 0.40% to less than 1.00%,
P: less than 0.010%,
S: not more than 0.010%,
Cr: 0.5% to less than 1.5%,
Mo: more than 0.35% to less than 1.5%,
V: more than 0.30% to 1.0%.

3. A high strength bolt as set forth in claim 1 or 2, characterized by said steel material further containing, by wt %

Al: 0.010 to 0.100%.

4. A high strength bolt as set forth in claim 1 or 2, characterized by said steel material further containing, by wt %

Nb: 0.005 to 0.030% and
Ti: 0.005 to 0.030%.

* * * * *